United States Patent
Aggoune et al.

(10) Patent No.: US 11,912,263 B2
(45) Date of Patent: Feb. 27, 2024

(54) SYSTEM AND METHOD FOR VEHICLE COAST CONTROL

(71) Applicant: DELPHI TECHNOLOGIES IP LIMITED, St. Michael (BB)

(72) Inventors: Karim Aggoune, Auburn Hills, MI (US); Peter M. Olin, Ann Arbor, MI (US); Zhaoxuan Zhu, Upper Arlington, OH (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 196 days.

(21) Appl. No.: 16/742,204

(22) Filed: Jan. 14, 2020

(65) Prior Publication Data

US 2021/0213932 A1 Jul. 15, 2021

(51) Int. Cl.
*B60W 20/12* (2016.01)
*B60W 40/09* (2012.01)
*B60W 30/18* (2012.01)
*B60W 30/14* (2006.01)

(52) U.S. Cl.
CPC .......... *B60W 20/12* (2016.01); *B60W 30/143* (2013.01); *B60W 30/18072* (2013.01); *B60W 40/09* (2013.01)

(58) Field of Classification Search
CPC ................. B60W 20/12; B60W 40/09; B60W 30/18072; B60W 30/143; B60W 2720/10; B60W 50/14; B60W 30/182; B60W 2540/30; B60W 2552/15; B60W 2050/146; B60W 2555/60; B60W 50/0097; B60W 2030/1809; B60W 30/16; B60W 2556/50

See application file for complete search history.

(56) References Cited

U.S. PATENT DOCUMENTS

| | | | |
|---|---|---|---|
| 7,765,058 | B2 | 7/2010 | Doering |
| 9,050,935 | B2 | 6/2015 | Stefan et al. |
| 9,081,651 | B2 | 7/2015 | Filev et al. |
| 9,135,759 | B2 | 9/2015 | Baer et al. |
| 2011/0282559 | A1 | 11/2011 | Isaji et al. |
| 2013/0173128 | A1 | 7/2013 | Syed et al. |

(Continued)

FOREIGN PATENT DOCUMENTS

| | | |
|---|---|---|
| DE | 102011083013 A1 | 3/2013 |
| DE | 102016200717 A1 * | 7/2017 |

(Continued)

OTHER PUBLICATIONS

JP-2017140962-A—Watanabe—English Translation (Year: 2016).*
DE-102016200717-A1—Schueler—English Translation (Year: 2016).*

*Primary Examiner* — Scott A Reinbold
(74) *Attorney, Agent, or Firm* — Dickinson Wright PLLC

(57) ABSTRACT

A method for controlling vehicle propulsion includes identifying at least one route characteristic of a portion of a route being traversed by a vehicle. The method further includes determining a profile for a target vehicle speed based on the at least one route characteristic and a vehicle energy consumption profile. The method further includes selectively adjusting a vehicle speed control input based on the target vehicle speed profile. The method further includes communicating the vehicle speed control input to a vehicle propulsion controller to achieve the target vehicle speed profile.

20 Claims, 5 Drawing Sheets

(56) References Cited

U.S. PATENT DOCUMENTS

| | | | | |
|---|---|---|---|---|
| 2014/0336887 | A1* | 11/2014 | Sujan | B60W 10/11 |
| | | | | 701/54 |
| 2017/0008468 | A1 | 1/2017 | Lindhuber et al. | |
| 2018/0222483 | A1* | 8/2018 | Yoon | B60W 30/143 |
| 2019/0100209 | A1* | 4/2019 | Plianos | B60W 30/18072 |
| 2019/0164451 | A1 | 5/2019 | Gaither et al. | |
| 2019/0184996 | A1* | 6/2019 | Follen | B60W 30/143 |
| 2020/0148197 | A1* | 5/2020 | Yoon | H04W 4/44 |
| 2020/0216067 | A1* | 7/2020 | Olin | B60W 20/15 |
| 2020/0377097 | A1* | 12/2020 | Won | B60W 50/14 |

FOREIGN PATENT DOCUMENTS

| | | | | |
|---|---|---|---|---|
| DE | 102017204983 A1 | 10/2018 | | |
| DE | 102017206006 A1 * | 10/2018 | ...... | B60W 30/18072 |
| DE | 102017206006 A1 | 10/2018 | | |
| EP | 2476597 A1 * | 7/2012 | .......... | B60W 30/143 |
| EP | 2476597 A1 | 7/2012 | | |
| JP | 2017140962 A * | 8/2017 | ...... | B60W 30/18072 |

* cited by examiner

SYSTEM AND METHOD FOR VEHICLE COAST CONTROL

GOVERNMENT LICENSE RIGHTS

This invention was made with government support under the DE-AR0000794 contract awarded by United States Department of Energy, Advanced Research Projects Agency (ARPA-E). The government has certain rights in the invention.

TECHNICAL FIELD

This disclosure relates to vehicle control, and in particular to systems and methods for improving vehicle energy efficiency through vehicle coast control.

BACKGROUND

Vehicles, such as cars, trucks, sport utility vehicles, crossovers, mini-vans, or other suitable vehicles, may include various automatic vehicle propulsion control systems, such as cruise control, adaptive cruise control, and the like. Typically, such systems receive input from a driver that indicates a desired vehicle speed. The automatic vehicle propulsion control systems typically interact with various vehicle components, such as a throttle, brake system, and the like, to achieve the desired speed.

The automatic vehicle propulsion control systems may be capable of maintaining the desired vehicle speed by adjusting a torque demand provided to various vehicle components, such is the case with cruise control, or may be capable of maintaining the desired vehicle speed and adjusting the vehicle speed to maintain a safe distance from a lead vehicle (e.g., a vehicle immediately in front of the vehicle operating the automatic vehicle propulsion control system), such is the case with adaptive cruise control.

SUMMARY

This disclosure relates generally to vehicle propulsion control systems and methods.

An aspect of the disclosed embodiments is a method for controlling vehicle propulsion. The method includes identifying at least one route characteristic of a portion of a route being traversed by a vehicle. The method further includes determining a profile for a target vehicle speed based on the at least one route characteristic and a vehicle energy consumption profile. The method further includes selectively adjusting a vehicle speed control input based on the target vehicle speed profile. The method further includes communicating the vehicle speed control input to a vehicle propulsion controller to achieve the target vehicle speed profile.

Another aspect of the disclosed embodiments is an apparatus for controlling vehicle propulsion. The apparatus includes a memory and a processor. The memory includes instructions executable by the processor to: identify at least one route characteristic of a portion of a route being traversed by a vehicle; determine a profile for a target vehicle speed based on the at least one route characteristic and a vehicle energy consumption profile; selectively adjust a vehicle speed control input based on the target vehicle speed profile; and communicate the vehicle speed control input to a vehicle propulsion controller to achieve the target vehicle speed profile.

Another aspect of the disclosed embodiments is a non-transitory computer-readable storage medium. The non-transitory computer-readable medium includes executable instructions that, when executed by a processor, facilitate performance of operations, comprising: receiving, from a remotely located computing device, a plurality of route characteristics corresponding to a route being traversed by a vehicle; identifying at least one route characteristic of the plurality of route characteristics, the at least one route characteristic corresponding to a portion of the route being traversed by the vehicle; determining a profile for a target vehicle speed based on the at least one route characteristic and a vehicle energy consumption profile, wherein the vehicle energy consumption profile is predetermined based on vehicle parameters contributing to vehicle energy consumption; selectively adjusting a vehicle speed control input based on the target vehicle speed profile; and communicating the vehicle speed control input to a vehicle propulsion controller to achieve the target vehicle speed profile.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
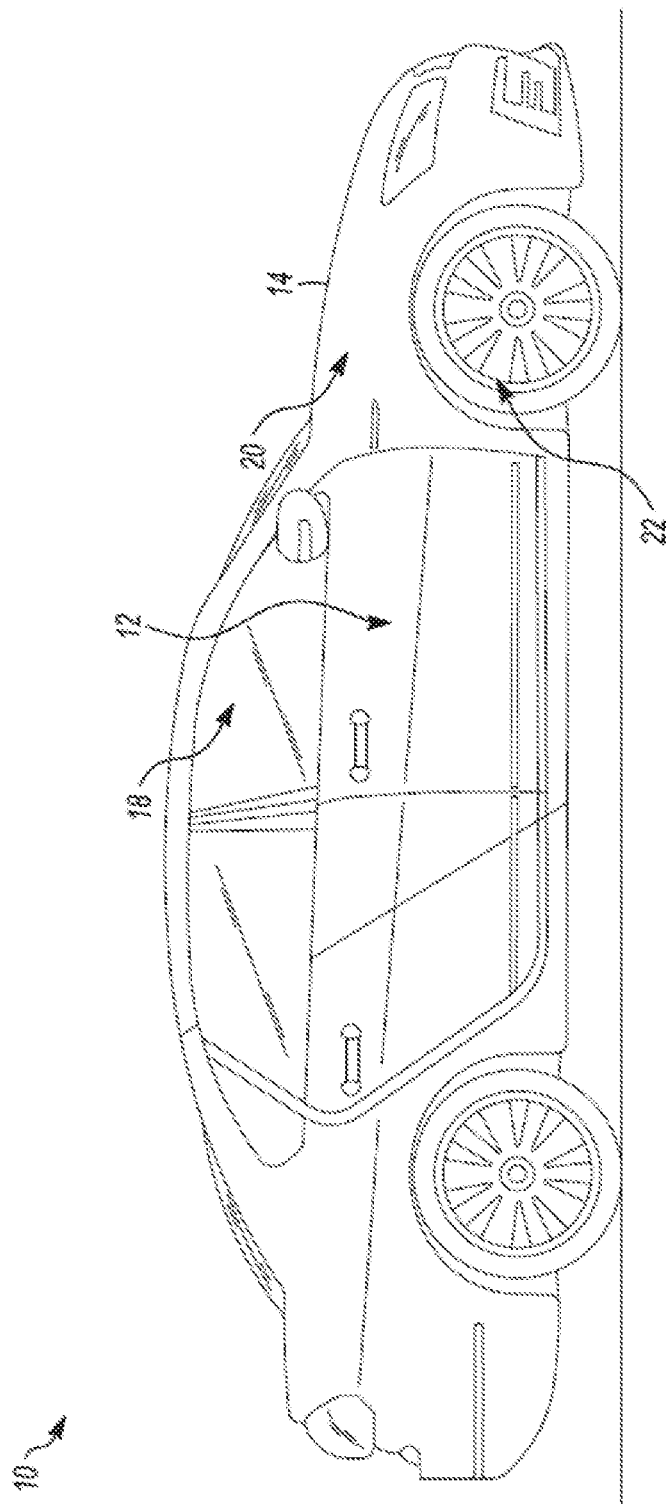
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, may include various automatic vehicle propulsion control systems, such as cruise control, adaptive cruise control, and the like. Typically, such systems receive input from a driver that indicates a desired vehicle speed. The automatic vehicle propulsion control systems typically interact with various vehicle components, such as a throttle, brake system, and the like, to achieve the desired speed.

The automatic vehicle propulsion control systems may be capable of maintaining the desired vehicle speed by adjusting a torque demand provided to various vehicle components, such is the case with cruise control, or may be capable of maintaining the desired vehicle speed and adjusting the vehicle speed to maintain a safe distance from a lead vehicle (e.g., a vehicle immediately in front of the vehicle operating the automatic vehicle propulsion control system), such is the case with adaptive cruise control. However, such systems are not capable of bringing the vehicle to a complete stop, as is the case with cruise control, or not capable of bringing the vehicle to a complete stop in the absence of a lead vehicle, as is the case with adaptive cruise control.

Further, such systems are not able to determine whether to allow the vehicle to coast to a stop. Allowing the vehicle to coast may avoid energy dissipation caused by braking before traffic light or stop sign. Additionally, reaching a stop point, such as a traffic light or stop sign, at the lowest speed, without triggering rolling idle, may be beneficial to fuel consumption. However, reaching a stop point at the lowest possible speed may be undesirable for the operator (which may include a driver) of the vehicle.

According, systems and methods, such as those described herein, that are configured to improve energy efficiency of a vehicle by controlling vehicle propulsion of the vehicle during a coasting event, may be desirable. In some embodiments, the systems and methods described herein may be configured to determine a target speed that is indicative of a compromise between energy efficiency, drivability, and operator acceptance while operating the vehicle. In some embodiments, the systems and methods described herein may be configured to determine the target speed using various types of stops (e.g., stop signs, traffic lights, turns in a path being traversed by the vehicle), personality characteristics of the operator, mood characteristics of the operator, a speed limit, traffic characteristics, other suitable information or data, or a combination thereof.

In some embodiments, the systems and methods described herein may be configured to use machine learning (e.g., Bayesian Optimization or other suitable machine learning) to trade off energy savings for operator acceptance. The systems and methods described herein may be configured to learn characteristics of multiple operators of the vehicle. The systems and methods described herein may be dependent on vehicle speed and/or vehicle speed and other suitable data.

In some embodiments, the systems and methods described herein may be configured to identify at least one route characteristic of a portion of a route being traversed by a vehicle. The systems and methods described herein may be configured to determine a profile for a target vehicle speed based on the at least one route characteristic and a vehicle energy consumption profile. The systems and methods described herein may be configured to selectively adjust a vehicle speed control input based on the target vehicle speed profile. The systems and methods described herein may be configured to communicate the vehicle speed control input to a vehicle propulsion controller to achieve the target vehicle speed profile.

While autonomous vehicles are capable of maintaining efficient speed profiles, in the absence of autonomy, vehicles do not have a way of recommending that an operator start coasting based on a target coast end speed, nor of adjusting the target coast end speed on the basis of whether the operator responded to the recommendation. Accordingly, systems and methods, such as those disclosed herein, that provide vehicle propulsion control in order to achieve an optimum energy consumption may be desirable.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
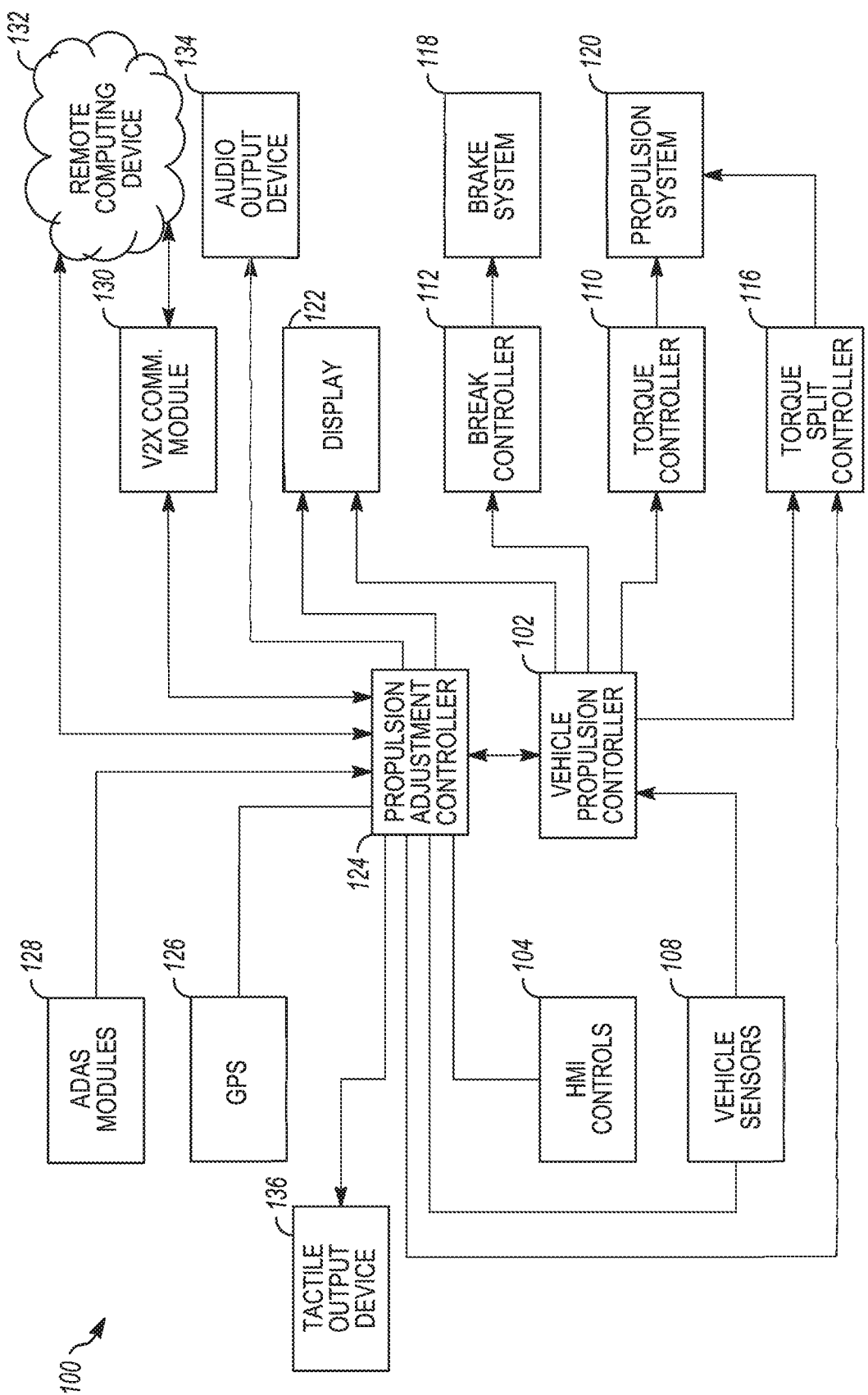
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the driver. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing device. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the system 100 may include an audio output device 134. The audio output device 134 may include speakers, chimes, other suitable audio output devices, or a combination thereof. The audio output device 134 may be configured to selectively communicate audible signals to the operator of the vehicle 10 to indicate various information, as will be described. In some embodiments, the vehicle 10 includes a tactile output device 136, such as a vibration motor or other suitable tactile output device. The tactile output device 136 may be disposed in a vehicle seat, such as the operator or driver seat, the steering wheel, or another suitable location within the vehicle 10. The tactile output device 136 may be configured to provide a tactile output to the operator of the vehicle 10 to indicate various information, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 is in communication with one or more human to machine interface (HMI) controls 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the driver of the vehicle 10 may interface with the HMI controls 104 to use the VPC 102 to control vehicle propulsion and/or other features of the VPC 102. For example, the driver may actuate an HMI switch of the HMI controls 104 disposed on the steering wheel of the vehicle 10. The HMI controls 104 may communicate a signal to the VPC 102.

The signal may indicate a desired vehicle speed selected by the driver. The VPC 102 generates a torque demand corresponding to the desired vehicle speed and communicates the torque demand to a torque controller 110. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The driver may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse an incline that causes the vehicle 10 to reduce current vehicle speed (e.g., because the torque demand applied by the torque controller 110 is insufficient to maintain vehicle speed while on the incline). The VPC 102 may increase the torque demand in order adjust the current vehicle speed, thereby achieving the desired vehicle speed.

In some embodiments, such as when the VPC 102 includes an adaptive cruise control mechanism, the VPC 102 may adjust the torque demand based on the proximity of a lead vehicle (e.g., a vehicle immediately in front of the vehicle 10). For example, the VPC 102 may receive information from the vehicle sensors 108 indicating the presence of a lead vehicle. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed. For example, the driver may indicate, using the HMI controls 104, to maintain pace with the lead vehicle while keeping a safe stopping distance between the vehicle 10 and the lead vehicle. The VPC 102 may selectively increase the torque demand if the lead vehicle is traveling faster than the vehicle 10 and may selectively decrease the torque demand if the lead vehicle is traveling slower relative to the vehicle 10.

The VPC 102 may bring the vehicle 10 to a complete stop when the lead vehicle comes to a complete stop. For example, the VPC 102 may be in communication with the brake controller 112 to send a plurality of signals over a period indicating to the brake controller 112 to control vehicle braking (e.g., the VPC 102 may bring the vehicle to a stop over a period so as not to suddenly stop the vehicle, however, in the case of a sudden stop of the lead vehicle, the VPC 102 brings the vehicle 10 to a sudden stop to avoid collision with the lead vehicle). The brake controller 112 may be in communication with the brake system 118. The brake system 118 may include a plurality of brake components that are actuated in response to the brake controller 112 implementing braking procedures based on the plurality of signals from the VPC 102. In some embodiments, the VPC 102 may implement engine braking through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control after a stop, the driver indicates to resume vehicle propulsion control using the HMI controls 104 (e.g., the VPC 102 may not be configured to resume vehicle propulsion control without interaction from the driver).

In some embodiments, VPC 102 may be configured to resume vehicle propulsion control without interaction from the driver. For example, the VPC 102 may determine whether a stop has lasted longer than a threshold period (e.g., such as 5 seconds or other suitable period). If the VPC 102 determines that the stop has not lasted longer than the threshold period, the VPC 102 resumes vehicle propulsion control. Conversely, if the VPC 102 determines that the stop has lasted longer than the threshold period, the VPC 102 may disengage and/or wait for input from the HMI controls 104, as described. In some embodiments, the vehicle 10 may include a higher level of automation including a higher level of propulsion control, as described, and may include suitable controls for bringing the vehicle 10 to a complete stop without interaction with the driver of the vehicle 10.

In some embodiments, the VPC 102 may determine a torque split in order to utilize an internal combustion engine and an electric motor of the vehicle 10 (e.g., in the case where the vehicle 10 is a hybrid vehicle). It should be understood that while only an internal combustion engine and an electric motor are described, the vehicle 10 may include any hybrid combination of any suitable vehicle engines and motors. The torque split indicates a portion of the torque demand to be applied to the internal combustion engine and a portion of the torque demand to be applied to the electric motor. For example, the electric motor may be used for vehicle propulsion when the torque demand is below a threshold. However, when the torque demand is above the threshold (e.g., such as the case when the vehicle 10 is on a steep incline) the internal combustion engine may provide at least a portion of vehicle propulsion in order to assist the electric motor. The VPC 102 communicates the torque split to the torque split controller 116. The torque split controller 116 is in communication with the propulsion system 120 to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop.

In some embodiments, the VPC 102 may determine whether to apply the desired vehicle speed set by the driver using the HMI controls 104 based on the signal from the safety controls (e.g., in order to maintain a safe distance between the vehicle 10 and the lead vehicle). For example, the driver may use the HMI controls 104 to indicate an increase in the desired vehicle speed, which, if implemented by the VPC 102, may bring the vehicle 10 closer to the lead vehicle The VPC 102 may determine not to apply the desired vehicle speed, and instead may provide an indication to the display 122 indicating to the driver that increasing the desired vehicle speed may be unsafe or the VPC 102 may ignore the increase in the desired vehicle speed. Additionally, or alternatively, the driver may use the HMI controls 104 to provide a desired distance between the vehicle 10 and the lead vehicle. The VPC 102 may determine whether the desired distance is a safe distance based on information received from the safety controls. If the VPC 102 determines that the desired distance is a safe distance, the VPC 102 may increase and/or decrease the vehicle speed in order to maintain the desired distance. Conversely, if the VPC 102 determines that the desired distance is not a safe distance, the VPC 102 may provide an indication to the display 122 indicating to the driver that desired distance may be an unsafe distance or the VPC 102 may ignore the desired distance.

In some embodiments, the VPC 102 may be in communication with a transmission controller module (TCM). The VPC 102 may receive information from the TCM (e.g., an automatically selected gear) and may determine and/or adjust the total torque demand based on the information received from the TCM.

As described, the system 100 includes a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine the profile for the target vehicle speed based on an energy consumption profile of the vehicle 10. The energy consumption profile may be generated using the information described above and may indicate an optimum energy consumption of the vehicle 10 for various route characteristics, such as road grades, curvatures, traffic, speed limits, stop signs, traffic signals, other route characteristics, or a combination thereof.

The PAC 124 receives route characteristics (e.g., road grade characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module may be disposed within the vehicle 10 (e.g., within the system 100) or may be disposed on a remote computing device, such as the remote computing device 132. When the mapping characteristics module is disposed on the remote computing device 132, the GPS antenna 126 may capture various global positioning signals from various global positioning satellites or other mechanisms. The GPS antenna 126 may communicate the captured signals to the mapping characteristics module. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the driver of the vehicle 10 to improve vehicle safety and road safety. The ADAS modules 128 may be configured to automate and/or adapt and enhance vehicle systems for safety and better driving. The ADAS modules 128 may be configured to alert the driver of the vehicle 10 of upcoming traffic conditions or disabled vehicles and/or to alert the vehicle 10 of a vehicle proximate to the vehicle 10 in order to avoid collisions and accidents. The PAC 124 may receive information, such as traffic characteristics, vehicle proximity information, disabled vehicle information, other suitable information, or a combination thereof, from the ADAS modules 128.

The PAC 124 may receive, at least, some of the route characteristics from the V2X module communication 130. The V2X communication module 130 is configured to communicate with other systems proximate or remotely located from the vehicle 10, as described, to obtain and share information, such as, traffic information, vehicle speed information, construction information, other information, or a combination thereof. The PAC 124 may receive other vehicle speed information, other vehicle location information, other traffic information, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, a make and model of the vehicle 10, manufacturer provided energy consumption efficiency of the vehicle 10, a weight of the vehicle 10, other vehicle parameters, or a combination thereof.

In some embodiments, the PAC 124 may receive traffic signal location information, traffic stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the driver of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the driver of the vehicle 10. For example, the driver may interact with an interface of the PAC 124, such as using the display 122 or using a mobile computing device, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the driver may provide route characteristics, such as a route map, route distance, other route characteristics, or a combination thereof, to the PAC 124. In some embodiments, the PAC 124 learns behavior of the driver of the vehicle 10. For example, the PAC 124 monitors the driver's vehicle speed relative to posted speed limits or whether the driver implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 is configured to control propulsion of the vehicle 10. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the driver of the vehicle 10 with a recommended vehicle speed. In some embodiments, the VPC 102 may include an adaptive cruise control mechanism. As described, the adaptive cruise control mechanism is configured to maintain the desired vehicle speed provided by the driver of the vehicle 10 using the HMI controls 104, and the adaptive cruise control mechanism is configured to maintain a safe distance between the vehicle 10 and a lead vehicle. Further, the adaptive cruise control mechanism is configured to bring the vehicle 10 to a complete stop in response to the lead vehicle coming to a complete stop. Additionally, the adaptive cruise control mechanism is incapable of bringing the vehicle 10 to a complete stop in the absence of a lead vehicle. Accordingly, the VPC 102 (e.g., the adaptive cruise control mechanism) cannot take advantage of energy efficient vehicle propulsion control (e.g., such as a coasting to a stop in response to a determination that vehicle 10 is approaching a stop sign). The PAC 124 is configured to determine a target vehicle propulsion profile, which may include one or more target vehicle speeds and one or more target torque splits, based on an energy consumption profile for the vehicle 10. The PAC 124 may determine a target torque demand based on profiles of a target vehicle speed and/or a target torque split.

In some embodiments, the PAC 124 determines the vehicle energy consumption profile using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof. The vehicle energy consumption profile may indicate that the vehicle 10 consumes a specified amount of energy (e.g., within a tolerance range) while operating at a specific vehicle speed (within a tolerance) while traversing routes having particular road, traffic, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132.

The PAC 124 is configured to use the vehicle energy consumption profile and various route characteristics to determine the profiles for the target vehicle speed and/or target torque split for a portion of a route being traversed by the vehicle 10. For example, the PAC 124 may determine that the vehicle 10 is approaching a particular variation in grade over the portion of the route being traversed by the vehicle 10. The PAC 124 uses the vehicle energy consumption profile to identify a vehicle speed (within a threshold range of the desired vehicle speed provided by the driver to the VPC 102) and/or a torque split having an optimum energy consumption for the grade variation of the portion of the route being traversed by the vehicle. In some embodiments, the PAC 124 may determine the vehicle speed and torque split using historical energy consumption for a known route, such as a route previously traversed by the vehicle 10 or similar vehicles. The PAC 124 determines a target torque demand from the identified vehicle speed and determines a target torque split from the identified torque split. It should be understood that the PAC 124 continuously monitors the various characteristics received, as described, and continues to generate profiles for target vehicle speeds and/or target torque splits, such that, the vehicle 10 maintains an optimum or improved energy consumption while maintaining driver and/or passenger comfort (e.g., by avoiding sudden, unnecessary changes in vehicle speed).

In some embodiments, the PAC 124 may be configured to determine a target vehicle coast end speed. The target vehicle coast end speed may include a vehicle speed that represents a vehicle speed of the vehicle 10 during a coasting event, before re-accelerating or applying the brakes. The PAC 124 may determine the vehicle coast end speed to achieve optimum or improved energy consumption of the vehicle 10. For example, the PAC 124 may use known traffic conditions and route characteristics, as described above, to determine an energy efficient vehicle coast end speed. The PAC 124 may then adjust the target coast end speed based on a driver's historical responsiveness to recommendations. The PAC 124 may also adjust the target coast end speed based on the driver's current behavior (e.g., driver is driving more aggressively and is less likely to want to start coasting early).

The PAC 124 may be configured to determine a target coast start point based on the target coast end speed. For example, the PAC 124 may calculate back from the vehicle coast end speed based on known or historical coast-down information and energy efficiency information. Additionally, or alternatively, the PAC 124 may learn traffic conditions, as described, and may determine whether the vehicle 10 should coast in areas along a route known to typically have traffic based, for example, on time of day. In some embodiments, the PAC 124 may use SPaT information to determine when the vehicle 10 should coast in response to change traffic signals.

In some embodiments, the PAC 124 may be configured to calculate a coast function and/or a road load function (see the Equation (1)) to identify particular vehicle parameters using velocity dependent resistance force. Parameters of the road load function include, vehicle parameters, such as vehicle mass or weight, vehicle rolling friction, vehicle drag coefficient, other vehicle parameters, or a combination thereof, which may be received by the PAC 124, as described. These parameters may then be updated using a coast self-learning function, such that the PAC 124 identifies or requests a coast sequence, (e.g., from historical information and/or from the remote computing device 132) and calculates the coast function result. The PAC 124 may calculate the coast function when requested by the driver of the vehicle 10 who would be prompted to perform a particular learning maneuver by the PAC 124, or could be learned in the background.

Equation (1) Velocity dependent resistive forces: F=wind, tires, bearings, and other forces plus acceleration dependent inertial forces plus grade dependent gravitational forces:

$$F=(A+(B*v)+(C*v^2))+((1+\text{drive axle \%}+\text{non-drive axle \%})*(\text{Test Mass}*\text{acceleration}))+(\text{Test Mass}*g*\sin(\arctan(\text{grade \%})))$$

Where A represents the resistive force that is constant and does not vary with velocity (e.g., bearings, seals, tires, etc.), B represents the resistive force that varies linearly with velocity (e.g., drive train, differential, etc.), and C represents the resistive force that varies with the square of velocity (e.g., wind, tire deformation, etc.).

As described, the PAC 124 may control or interface with the VPC 102 and/or interface with the driver of the vehicle 10 in order to achieve the target vehicle speed and/or target torque split profiles, which may result in optimum or improved energy consumption efficiency of the vehicle 10. Additionally, or alternatively, the PAC 124 may control or interface with the VPC 102 in order to bring the vehicle 10 to a complete stop in response to the vehicle 10 approaching a stop sign, traffic signal, traffic, disabled vehicle, or other suitable conditions. The PAC 124 may also control or interface with the VPC 102 in order to resume vehicle propulsion after the vehicle 10 has come to a complete stop.

In some embodiments, the PAC 124 may control or interface with the VPC 102 using virtual inputs in order to achieve the target vehicle speed and/or target torque split profiles. As described, the VPC 102 may receive a desired vehicle speed from the driver of the vehicle 10 using the HMI controls 104. Additionally, or alternatively, the VPC 102 (e.g., when the VPC 102 includes an adaptive cruise control mechanism) may adjust the desired vehicle speed in response to a lead vehicle's speed.

In some embodiments, the PAC 124 initializes the VPC 102 using the desired speed provided by the driver of the vehicle 10 the first time the driver of the vehicle 10 engages the VPC 102 during a key cycle. The PAC 124 may then provide the virtual inputs to the VPC 102 in order to control vehicle speed to achieve optimum or improved energy consumption efficiency of the vehicle 10. In some embodiments, the PAC 124 may generate a virtual input that includes a virtual HMI signal that, when received by the VPC 102, may cause the VPC 102 to be enabled, be disabled, and/or to set or adjust the current vehicle speed. The PAC 124 generates the virtual HMI signal based on target vehicle speed profile. The PAC 124 is in communication with and/or interfaces with the HMI controls 104. The PAC 124 substitutes HMI signals provided by the driver of the vehicle 10 with the virtual HMI signal generated by the PAC 124. The VPC 102, as described, includes a plurality of safety controls. The VPC 102 then applies the target vehicle speed associated with the target vehicle speed profile indicated by the virtual HMI signal, in the same manner the VPC 102 applies a desired vehicle speed provided by the driver using the HMI controls 104, as described. The VPC 102 may determine whether to apply the target vehicle speed and/or the target torque split indicated by the virtual HMI signals based on the safety controls.

In some embodiments, the PAC 124 generates a virtual input that includes a virtual lead vehicle in order to control the VPC 102 to bring the vehicle 10 to a complete stop in the absence of an actual lead vehicle. For example, the PAC 124 may bring the vehicle 10 to a stop as the vehicle 10 approaches a stop sign, a traffic signal, traffic, a disabled vehicle, or other suitable stopping conditions that the vehicle 10 may encounter, as described. The PAC 124 substitutes information received by the VPC 102 from the vehicle sensors 108 (e.g., information the VPC 102 uses to detect an actual lead vehicle) with virtual information, signals, and/or inputs corresponding to the virtual lead vehicle.

The VPC 102 detects the presence of the virtual lead vehicle and performs operations associated with following a lead vehicle (e.g., maintain a safe distance between the vehicle 10 and the lead vehicle, keeping pace with the lead vehicle, and bringing the vehicle to a stop in response to the lead vehicle being within an object range of the vehicle 10 and coming to a complete stop). The PAC 124 may then control a virtual speed of the virtual lead vehicle based on the target vehicle speed profile. The VPC 102 may then adjust the current vehicle speed of the vehicle 10 to follow the virtual lead vehicle. In this manner, the PAC 124 may achieve the target vehicle speed profile of the vehicle 10 to provide optimum or improved energy consumption efficiency of the vehicle 10. While the PAC 124 is controlling the VPC 102 using the virtual inputs described, the vehicle sensors 108, such as cameras, radar, proximity sensors, and the like, continue to provide information to the VPC 102, such that, while the VPC 102 is applying or following the virtual inputs provided by the PAC 124, the VPC 102 may continue to detect actual vehicles or objects in front of the vehicle 10. The safety controls of the VPC 102 are configured to override the VPC 102, including the virtual inputs provided by the PAC 124. For example, the safety controls may override the VPC 102 based on the information from the vehicle sensors 108 to safely bring the vehicle 10 to a complete stop, to prevent the VPC 102 from increasing speed (e.g., where increasing the in vehicle speed may bring the vehicle 10 within an unsafe distance relative to the lead vehicle), or to decrease vehicle speed in response to a reduced vehicle speed of the lead vehicle.

In some embodiments, the PAC 124 may be in direct communication with the VPC 102 and the torque split controller 116 to provide recommended target torque demands and target torque splits to the VPC 102 and the torque split controller 116, respectively, to achieve an optimum or improved energy consumption efficiency of the vehicle 10. For example, the VPC 102 may be configured to receive HMI signals (e.g., as described), to follow a lead vehicle based on information from the vehicle sensors 108 (e.g., as described), and to receive a recommended target vehicle speed signal from the PAC 124. The VPC 102 may determine whether to apply the target vehicle speed indicated by the recommended target vehicle speed signal, for example, based on the driver input, the detection of a lead vehicle, and/or the safety controls of the VPC 102.

The torque split controller 116 may be configured to receive a recommended torque split signal from the VPC 102 based on the driver input, as described, and may be configured to receive a recommended target torque split signal from the PAC 124. It should be understood that the PAC 124 may communicate the recommended target torque split signal to the VPC 102, which then may communicate the recommended target torque split signal and/or the recommended torque demand signal (e.g., generated by the VPC 102) to the torque split controller 116. The torque split controller 116 determines whether to apply the target torque split indicated by the recommended target toque split signal based on a comparison to the torque split indicated by the recommended torque split signal provided by the VPC 102 and/or based on an existing propulsion state of the vehicle 10 (e.g., including diagnostic conditions).

In some embodiments, the PAC 124 may communicate with the display 122 to provide an indicator to the driver that the vehicle speed is changing in order to improve energy consumption efficiency of the vehicle 10. For example, the PAC 124 may use the display 122 to illustrate an energy efficiency symbol that indicates to the driver of the vehicle 10 that the vehicle speed is changing in order to improve energy consumption efficiency of the vehicle 10.

In some embodiments, as described, the VPC 102 may not include an adaptive cruise control system and may include a basic cruise control system. Additionally, or alternatively, the driver of the vehicle 10 may not engage the VPC 102 in order to control propulsion of the vehicle 10 (e.g., the driver of the vehicle 10 may control propulsion manually). Accordingly, the PAC 124 is configured to provide a recommendation to the driver indicating a target vehicle speed of a target vehicle speed profile. The recommendation may be provided to the driver of the vehicle 10 using one or more integrated displays of the vehicle 10, such as the display 122 which may include a portion of a dash or console of the vehicle 10, a navigation display of the vehicle 10, or other suitable integrated displays of the vehicle 10. In some embodiments, the recommendation may be provided to the driver of the vehicle 10 using a mobile computing device within the vehicle 10. The recommendation may include a symbol or textual information that indicates to the driver of the vehicle 10 to increase or decrease vehicle speed. Additionally, or alternatively, the recommendation may include a coast recommendation that is displayed for a calabratable amount of time and is then withdrawn in response to the driver of the vehicle 10 ignoring the recommendation. The recommendation may include information indicating that the recommendation is in response to a change in speed limit, a stop sign being approached by the vehicle 10, traffic signal timing, and status, or other information. The information may be visually displayed and may decay as the vehicle 10 recommendation becomes obsolete.

The driver of the vehicle 10 may determine to honor the recommendation and change the vehicle speed accordingly, or the driver may choose to ignore the recommendation. The PAC 124 may be configured to monitor driver action in response to the recommendation to determine whether the driver of the vehicle 10 honored the recommendation or ignored the recommendation. The PAC 124 may determine whether to adjust recommendations based on the monitored driver action. For example, the PAC 124 may determine not to recommend coasting in response to the driver ignoring a threshold number of coasting recommendations. Additionally, or alternatively, the PAC 124 may determine, using the monitored driver action and the route traversed by the vehicle 10, whether the driver of the vehicle 10 honors the recommendation at certain portions of the route and ignores the recommendations at other portions of the route. The PAC 124 may selectively provide the recommendations to the driver of the vehicle 10 based on the monitored driver action and the vehicle route. Additionally, or alternatively, the PAC 124 may monitor the driver action in response to the recommendation based on traffic patterns, stop signs, traffic signals, and the like. The PAC 124 may selectively determine whether to provide the driver of the vehicle 10 the recommendations based on the monitored driver action in response to traffic patterns, stop signs, traffic signals, and the like.

In some embodiments, the PAC 124 and/or the VPC 102 may perform the methods described herein. However, the methods described herein as performed by the PAC 124 and/or the VPC 102 are not meant to be limiting, and any type of software executed on a controller may perform the methods described herein without departing from the scope of this disclosure. For example, a controller, such as a processor executing software within a computing device onboard the vehicle 10, may perform the methods described herein.

Figure 3A:
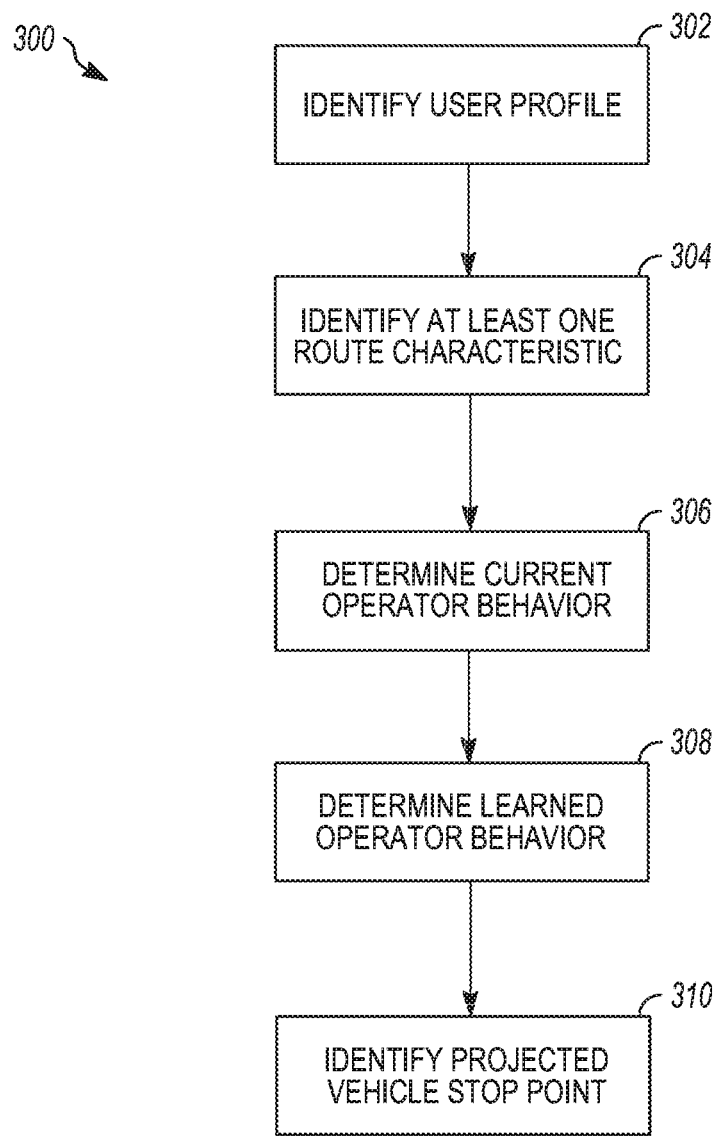
FIGS. 3A and 3B generally illustrate an alternative vehicle propulsion control method according to the principles of the present disclosure.
Figure 3B:
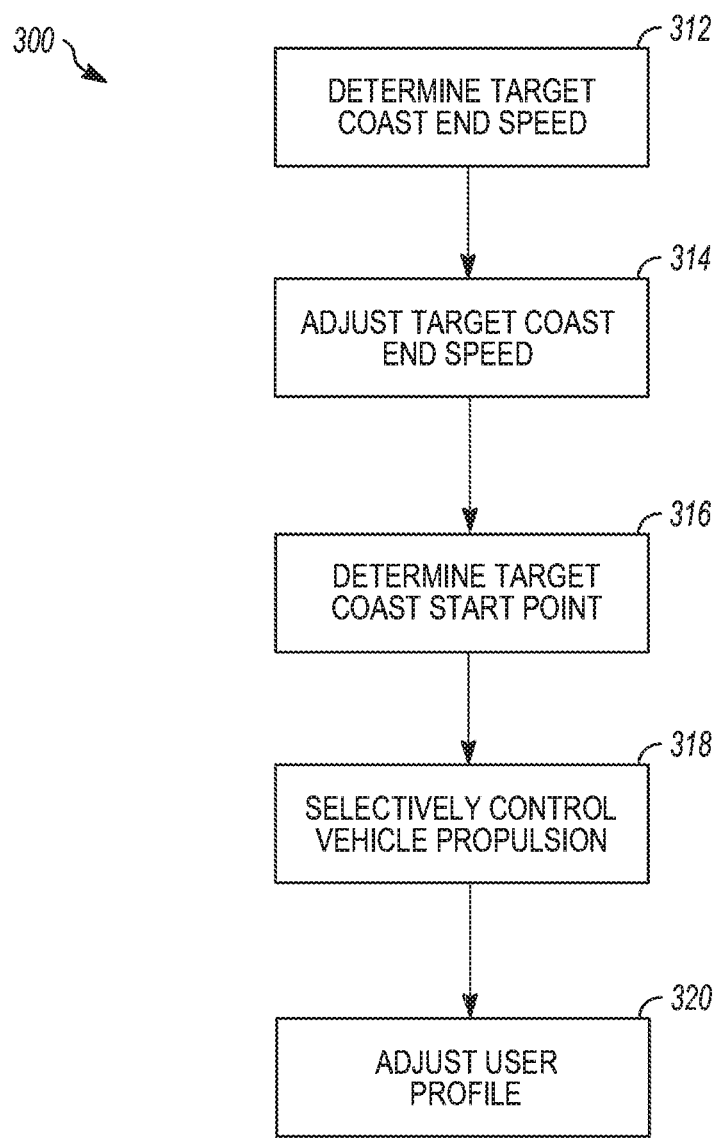

FIGS. 3A and 3B show a flow diagram generally illustrating a coasting control method 300 according to the principles of the present disclosure.

At 302, the method 300 identifies a user profile for an operator of the vehicle. For example, the PAC 124 may identify a user profile for an operator of the vehicle 10. In some embodiments, the operator of the vehicle is a driver of the vehicle 10. In some embodiments, there are multiple user profiles associated with the vehicle. The PAC 124 may identify the operator of the vehicle 10 based on having a key fob associated with the operator and user profile and receiving information about which key fob is being used by the operator from sensors within the vehicle 10, biometric information received from sensors within the vehicle 10, the operator making a selection on a presented graphical interface on the display 122 about the operator of the vehicle 10, or any other desired identification method.

At 304, the method 300 identifies at least one route characteristic of a portion of a route being traversed by the vehicle 10. For example, the PAC 124 may identify at least one route characteristic of a portion of a route being traversed by the vehicle 10. Route characteristics may include, but are not limited to, the time of day, weather conditions, traffic conditions, pavement information, and grade, as well as other route characteristics discussed earlier.

At 306, the method 300 determines a current behavior of the operator. For example, the PAC 124 may determine a current behavior of the operator. The PAC 124 may determine the current behavior based on rates of acceleration and braking performed by the operator, a learned distance from a stopping point that the operator begins coasting, whether the operator appears to be distracted based on the operator's reaction time (e.g., such as a reaction time of the operator in response to a vehicle in front of the vehicle 10 accelerating from a stop), other information, or a combination thereof. The information may be provided to the PAC 124 by various sensors as described. In some embodiments, the PAC 124 may determine the current operator behavior for a current trip. Additionally, or alternatively, the PAC 124 may store operator behavior information over a period (e.g., more than one trip) and may determine the current operator behaving for the current trip based on the stored operator behavior. Additionally, or alternatively, the PAC 124 may determine the current operator behavior for the current trip using the stored operator behaving and may selectively adjust the current operator behaving based on the operator behavior during the current trip. Current behaviors may also include specific operator responses to specific route characteristics. In some embodiments, PAC 124 may update the user profile based on the determined current behavior of the operator.

At 308, the method 300 determines a learned operator behavior based on the user profile. For example, the PAC 124 may determine a learned operator behavior based on the user profile. The PAC 124 may determine the learned operator behavior based on historical inputs of current operator behavior. The PAC 124 may determine the learned operator behavior based on past responses of the operator to specific route characteristics. The PAC 124 may determine the learned operator behavior based on past responses of other operators to specific route characteristics. The PAC 124 may determine the learned operator behavior based on current operator behavior. For example, the PAC 124 may determine that when the operator is driving particularly aggressively, the operator is likely to have a certain braking distance and be unwilling to start coasting as early and to coast down to a speed as low as when the operator is driving more conservatively. As another example, the PAC 124 may determine that the operator drives aggressively Monday mornings, and more conservatively Monday afternoon.

At 310, the method 300 identifies a projected vehicle stop point or projected vehicle slowdown point associated with the portion of the route being traversed by the vehicle. For example, the PAC 124 may identify a projected vehicle stop point or projected vehicle slowdown point associated with the portion of the route being traversed by the vehicle. The PAC 124 may identify the projected vehicle stop point or projected vehicle slowdown point as a physical location or a projected point in time. Examples include the PAC 124 identifying the projected vehicle stop point or projected vehicle slowdown point at a stop sign, at a traffic light, tight curve in the road, or at a projected point (time or location) before reaching a car in front of the vehicle 10.

At 312, the method 300 determines a target coast end speed based on the at least one route characteristic and the projected vehicle stop point or projected vehicle slowdown point. For example, the PAC 124 may determine a target coast end speed based on the at least one route characteristic and the projected vehicle stop point or projected vehicle slowdown point. The PAC 124 may determine the target coast end speed based on the speed and distance before braking would start. The PAC 124 may determine the target coast end speed based on a calculated speed for going through a corner. The PAC 124 may determine the target coast end speed based on SPaT information to avoid having to fully decelerate and brake before a signal changes (e.g., from red to green). The PAC 124 may determine the target coast end speed by calculating to optimize time spent coasting and thus energy efficiency. In some embodiments where the vehicle has regenerative braking, the PAC 124 may weigh the coasting distance against braking to find the most efficient ratio for regenerative braking. In some embodiments, The PAC 124 may determine the target coast speed based on vehicle parameters.

At 314, the method 300 selectively adjusts the target coast end speed. For example, the PAC 124 may selectively adjust the target coast end speed. The PAC 124 may selectively adjust the target coast end speed may be based on current behavior, learned operator behavior, or a combination thereof. The PAC 124 may selectively adjust the target coast end speed based on cloud-based information on how other operators respond to route characteristics. For example, the PAC 124 may selectively adjust the target coast end speed based on current behavior by adjusting the target coast end speed up based on the operator driving more aggressively (e.g. accelerating faster, braking harder, taking turns faster, waiting further to start coasting, etc.). For example, the PAC 124 may selectively adjust the target coast end speed based on learned operator behavior by adjusting the target coast end speed down based on history of the operator showing that the operator is willing to start coasting sooner to end up at a lower coast end speed. As an example, the PAC 124 may selectively adjust the target coast end speed based on both current behavior and learned operator behavior by adjusting the target coast end speed up based on learned operator behavior that the operator is less receptive to starting coasting early when the operator is driving more aggressively.

At 316, the method 300 determines a target coast start point based on the at least one route characteristic and the target coast end speed. For example, the PAC 124 may determine a target coast start point based on the at least one route characteristic and the target coast end speed. The PAC 124 may determine the target coast start point based on the distance required to reach the target coast end speed.

At 318, the method 300 selectively controls vehicle propulsion of the vehicle based on the target coast start point. For example, the PAC 124 may selectively control vehicle propulsion of the vehicle based on the target coast start point.

In some embodiments, selectively controlling vehicle propulsion of the vehicle based on the target coast start point includes communicating a recommendation to the operator of the vehicle to begin coasting at the target coast start point. For example, the PAC 124 may send a signal to the display 122, audio output device 134, or tactile output device 136 recommending to the operator of the vehicle to begin coasting at the target coast start point. In some embodiments, coasting may involve removing application of the accelerator. In some embodiments, coasting may involve shifting to neutral. For example, the PAC 124 may communicate recommendations as visual notifications through the display 122 (for instance, a written notification to "start coasting now" on the dashboard). For example, the PAC 124 may communicate recommendations as audio notifications through the audio output device 134 (for instance, a voice from speakers stating "start coasting now" or a chime to indicate that the operator should start coasting). For example, the PAC 124 may communicate recommendations through the tactile output device 136 (e.g., vibrations in the seat of the vehicle 10 that indicate when or where the operator should start coasting).

In some embodiments, the PAC 124 may selectively control vehicle propulsion based on the target coast start point by generating a virtual input as a vehicle control input to the VPC 102 based on the target coast start point. For example, the PAC 124 may selectively control vehicle propulsion based on the target coast start point by generating a virtual input as a vehicle control input to the VPC 102 based on the target coast start point. In some embodiments, the virtual input generated by the PAC 124 includes a virtual human machine interface signal is sent from or in a way that imitates the HMI controls 104 to imitate a human initiating coasting. In some embodiments where the vehicle includes an adaptive cruise control mechanism, the PAC 124 may selectively control vehicle propulsion of the vehicle based on the target coast start point by generating a virtual input which includes generating a virtual lead vehicle. For example, the PAC 124 may send a signal to the adaptive cruise control system of the ADAS modules 128 to signal a the presence of a virtual lead vehicle whereby the adaptive cruise control system would start to coast in response to the placement of the virtual lead vehicle.

At 320, the method 300 adjusts the user profile based on a determination of whether the operator followed the recommendation. For example, the PAC 124 may adjust the user profile based on a determination of whether the operator followed the recommendation. If the operator followed the recommendation, the PAC 124 may adjust the user profile to include whether the operator followed the recommendation. The PAC 124 may also adjust the user profile to include the route conditions where the operator followed the recommendation. The PAC 124 may also adjust the user profile to include the current behavior preceding the operator's decision whether or not to follow the recommendation.

Figure 4:
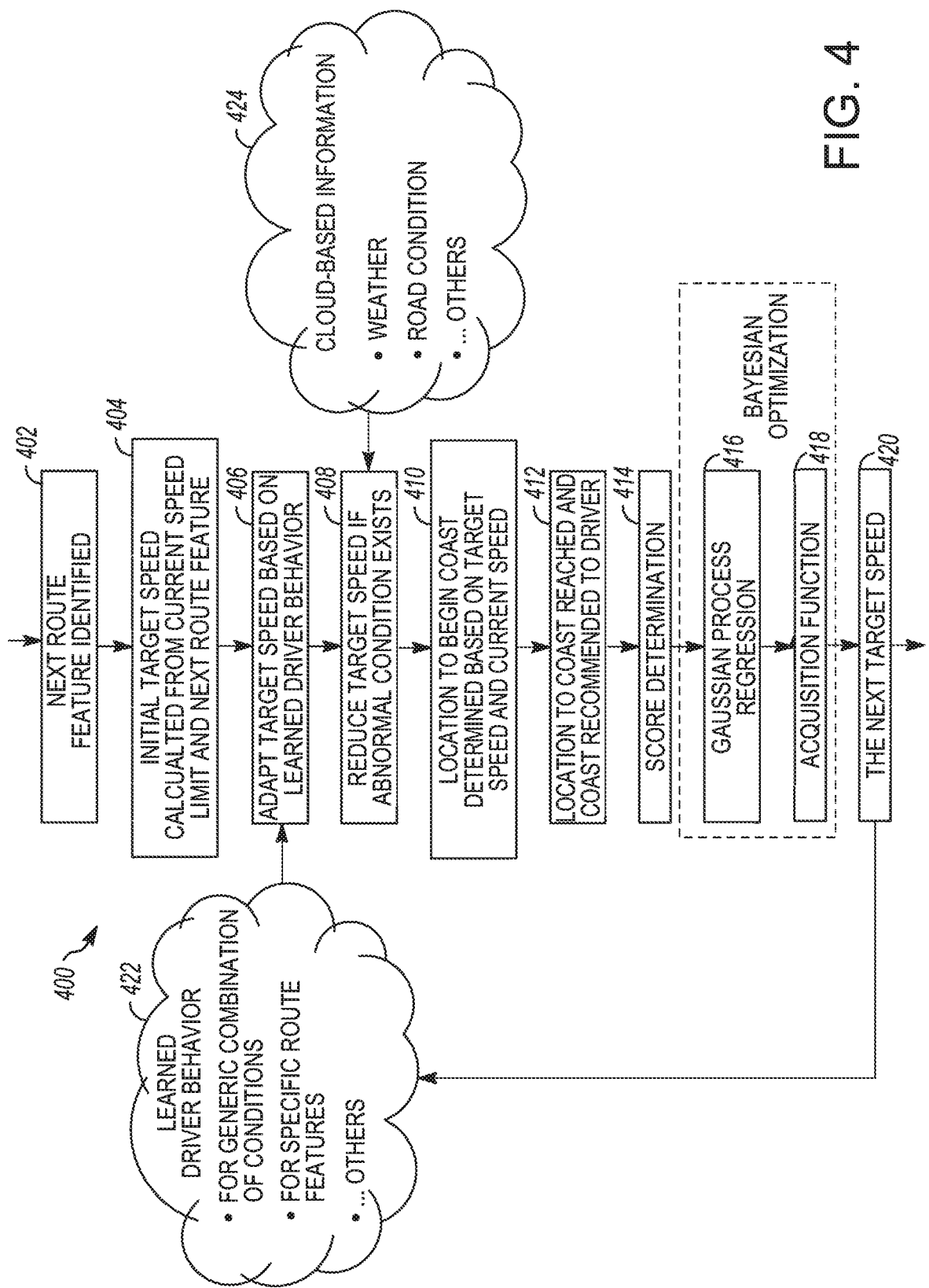
FIG. 4 generally illustrates another alternative vehicle propulsion control method according to the principles of the present disclosure

FIG. 4 is a flow diagram generally illustrating a coasting control method 400 according to the principles of the present disclosure. At 402, the method 400 identifies a route feature (e.g., or a route characteristic) of a route being traversed by the vehicle 10. For example, the PAC 124 may identify at least one route feature (or route characteristic) of a portion of a route being traversed by the vehicle 10. Route features (or route characteristics) may include, but are not limited to, traffic signs (e.g., stop signs, speed limit signs, and the like), traffic lights, other suitable route features, or a combination thereof. In some embodiments, the route features (or route characteristics) may include, but are not limited to, traffic signs (e.g., stop signs, speed limit signs, and the like), traffic lights, the time of day, weather conditions, traffic conditions, pavement information, and grade, other suitable route features including those described herein, or a combination thereof.

At 404, the method 400 calculates an initial target coasting speed (or initial target coast end speed) based on the current speed limit and the route feature. For example, the PAC 124 may determine the initial target coasting speed based on the route feature. The PAC 124 may determine the initial target coasting speed based on the speed and distance before braking would start. The PAC 124 may determine the initial target coasting speed on a calculated speed for going through a corner. The PAC 124 may determine the initial target coasting speed based on SPaT information to avoid having to fully decelerate and brake before a signal changes (e.g., from red to green). The PAC 124 may determine the initial target coasting speed by calculating to optimize time spent coasting and thus energy efficiency. In some embodiments where the vehicle has regenerative braking, the PAC 124 may weigh the coasting distance against braking to find the most efficient ratio for regenerative braking. In some embodiments, The PAC 124 may determine the initial target coasting speed based on vehicle parameters.

At 406, the method 400 adapts the target coasting speed (target coast end speed) based on learned driver behavior. For example, the PAC 124 may adapt the target coasting speed based on learned operator behavior by adjusting the target coasting speed down based on history of the operator showing that the operator is willing to start coasting sooner to end up at a lower coast end speed. The PAC 124 may adapt the target coasting speed based on learned driver behavior for a generic combination of conditions or for specific route features, as shown at 422.

At 408, the method 400 reduces target coasting speed (target coast end speed) based on information about whether abnormal conditions exist. For example, the PAC 124 may adapt the target coasting speed down based on weather or road conditions (ice, fog, snow, etc.), as shown at 424.

At 410, the method 400 determines the location to begin coasting (target coast start point) based on the target coasting speed and the current speed of the vehicle 10. For example, the PAC 124 may determine a target coast start point based on the at least one route characteristic and the target coast end speed. The PAC 124 may determine the target coast start point based on the distance required to reach the target coast end speed.

At 412, the method 400 recommends that the driver start coasting. For example, the PAC 124 may communicate recommendations as visual notifications through the display 122 (for instance, a written notification to "start coasting now" on the dashboard). For example, the PAC 124 may communicate recommendations as audio notifications through the audio output device 134 (for instance, a voice from speakers stating "start coasting now" or a chime to indicate that the operator should start coasting). For example, the PAC 124 may communicate recommendations through the tactile output device 136 (e.g., vibrations in the seat of the vehicle 10 that indicate when or where the operator should start coasting).

At 414, the method 400 determines a score based on how closely the driver followed the recommendation. For example, the PAC 124 may determine that the driver ignored the recommendation and apply a low score to the recommendation. The PAC 124 may determine that the driver followed the recommendation and apply a high score to the recommendation. The score may include a weighted value that represents the adherence to the recommendation by the driver of the vehicle 10.

414 and 416 make up the Bayesian Optimization of the target coasting speed.

At 416, the method 400 performs Gaussian Process Regression. For example, the PAC 124 may perform Gaussian Process Regression based on the score determined at 414 and past scores.

At 418, the method 400 uses an acquisition function to determine what modifications to make to future target coasting speeds. For example, the PAC 124 may input the results of the Gaussian Process Regression to determine what modifications to make to future target coasting speeds.

At 420, the method 400 produces the next target coasting speed taking into account the modifications determined at 418. For example, the PAC 124 may produce the next target coasting speed taking into account the modifications determined at 418 as initially calculated at 404 and adapted at 406.

It should be noted that the method 300 and the method 400 can include more or fewer elements, and the elements may occur in any functional order.

In some embodiments, a method for controlling vehicle propulsion includes identifying at least one route characteristic of a portion of a route being traversed by a vehicle. The method further includes determining a profile for a target vehicle speed based on the at least one route characteristic and a vehicle energy consumption profile. The method further includes selectively adjusting a vehicle speed control input based on the target vehicle speed profile. The method further includes communicating the vehicle speed control input to a vehicle propulsion controller to achieve the target vehicle speed profile.

In some embodiments of the method, selectively controlling vehicle propulsion of the vehicle based on the target coast start point includes communicating a recommendation to an operator of the vehicle to begin coasting at the target coast start point. In some embodiments, the method further includes selectively adjusting the target coast end speed based on a user profile. In some embodiments, the method further includes adjusting the user profile based on a determination of whether the operator followed the recommendation. In some embodiments, the method further includes determining a learned operator behavior based on the user profile and adjusting the target coast end speed based on the learned operator behavior. In some embodiments, the method further includes updating the user profile based on determined current behavior of the operator. In some embodiments, the method further includes determining current behavior of the operator and adjusting the target coast end speed based on the current operator behavior. In some embodiments of the method, the vehicle is selected from a group consisting of a semi-autonomous vehicle and an autonomous vehicle. In some embodiments, the method further includes generating a virtual input as a vehicle control input to a vehicle propulsion controller based on the target coast start point. In some embodiments, the vehicle propulsion controller includes an adaptive cruise control mechanism. In some embodiments, the virtual input includes a virtual lead vehicle. In some embodiments, the virtual input includes a virtual human machine interface signal.

In some embodiments, an apparatus for controlling vehicle propulsion includes a memory and a processor. The memory includes instructions executable by the processor to: identify at least one route characteristic of a portion of a route being traversed by a vehicle; determine a profile for a target vehicle speed based on the at least one route characteristic and a vehicle energy consumption profile; selectively adjust a vehicle speed control input based on the target vehicle speed profile; and communicate the vehicle speed control input to a vehicle propulsion controller to achieve the target vehicle speed profile.

In some embodiments, the instructions to selectively control vehicle propulsion of the vehicle based on the target coast start point include communicating a recommendation to an operator of the vehicle to begin coasting at the target coast start point. In some embodiments, the instructions further cause the processor to selectively adjust the target coast end speed based on a user profile. In some embodiments, the instructions further cause the processor to adjust the user profile based on a determination of whether the operator followed the recommendation. In some embodiments, the instructions further cause the processor to determine a learned operator behavior based on the user profile and adjust the target coast end speed based on the learned operator behavior. In some embodiments, the instructions further cause the processor to update the user profile based on determined current behavior of the operator, determine current operator behavior, and adjust the target coast end speed based on the current operator behavior.

In some embodiments, a non-transitory computer-readable storage medium includes executable instructions that, when executed by a processor, facilitate performance of operations, comprising: receiving, from a remotely located computing device, a plurality of route characteristics corresponding to a route being traversed by a vehicle; identifying at least one route characteristic of the plurality of route characteristics, the at least one route characteristic corresponding to a portion of the route being traversed by the vehicle; determining a profile for a target vehicle speed based on the at least one route characteristic and a vehicle energy consumption profile, wherein the vehicle energy consumption profile is predetermined based on vehicle parameters contributing to vehicle energy consumption; selectively adjusting a vehicle speed control input based on the target vehicle speed profile; and communicating the vehicle speed control input to a vehicle propulsion controller to achieve the target vehicle speed profile.

In some embodiments, selectively controlling vehicle propulsion of the vehicle based on the target coast start point includes communicating a recommendation to an operator of the vehicle to begin coasting at the target coast start point.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a general-purpose computer or general-purpose processor with a computer program that, when executed, carries out any of the respective methods, algorithms, and/or instructions described herein. In addition, or alternatively, for example, a special purpose computer/processor may be utilized which may contain other hardware for carrying out any of the methods, algorithms, or instructions described herein.

Further, all or a portion of implementations of the present disclosure may take the form of a computer program product accessible from, for example, a computer-usable or computer-readable medium. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling propulsion of a vehicle, the method comprising:
   identifying at least one route characteristic of a portion of a route being traversed by the vehicle;
   identifying a projected vehicle stop point or projected vehicle slowdown point associated with the portion of the route being traversed by the vehicle;
   identifying at least one vehicle parameter using a velocity dependent resistance force of a road load function;
   determining a vehicle energy consumption profile for the vehicle based on at least:
      historical data indicating energy consumption of the vehicle for at least a portion of a route previously traversed by the vehicle having at least one route characteristic corresponding to the at least one route characteristic of the portion of the route being traversed by the vehicle;
      the at least one vehicle parameter; and
      a plurality of other vehicle parameters of the vehicle, wherein the plurality of other vehicle parameters includes at least a weight of the vehicle and manufacturer provided vehicle energy efficiency;
   determining a target coast end speed based on the at least one route characteristic, the vehicle energy consumption profile, a rolling friction of the vehicle, a drag coefficient of the vehicle, and the projected vehicle stop point or projected vehicle slowdown point;
   determining a target coast start point based on the at least one route characteristic and the target coast end speed; and
   selectively controlling vehicle propulsion of the vehicle based on the target coast start point.

2. The method of claim 1, wherein selectively controlling vehicle propulsion of the vehicle based on the target coast start point includes communicating a recommendation to an operator of the vehicle to begin coasting at the target coast start point.

3. The method of claim 2, further comprising selectively adjusting the target coast end speed based on a user profile.

4. The method of claim 3, further comprising:
   adjusting the user profile based on a determination of whether the operator followed the recommendation.

5. The method of claim 4, further comprising:
   determining a learned operator behavior based on the user profile; and
   adjusting the target coast end speed based on the learned operator behavior.

6. The method of claim 5, further comprising updating the user profile based on determined current behavior of the operator.

7. The method of claim 1, further comprising:
   determining current behavior of an operator of the vehicle; and
   adjusting the target coast end speed based on the current operator behavior.

8. The method of claim 1, wherein the vehicle is selected from a group consisting of a semi-autonomous vehicle and an autonomous vehicle.

9. The method of claim 1, further comprising:
   generating a virtual input as a vehicle control input to a vehicle propulsion controller based on the target coast start point.

10. The method of claim 9, wherein the vehicle propulsion controller includes an adaptive cruise control mechanism.

11. The method of claim 10, wherein the virtual input includes a virtual lead vehicle.

12. The method of claim 9, wherein the virtual input includes a virtual human machine interface signal.

13. An apparatus for controlling propulsion of a vehicle comprising:
   a processor; and
   a memory including instructions that, when executed by the processor, cause the processor to:
      identify at least one route characteristic of a portion of a route being traversed by the vehicle;
      identify a projected vehicle stop point or projected vehicle slowdown point associated with the portion of the route being traversed by the vehicle;
      identity at least one vehicle parameter using a velocity dependent resistance force of a road load function;
      determine a vehicle energy consumption profile for the vehicle based on at least:
         historical data indicating energy consumption of the vehicle for at least a portion of a route previously traversed by the vehicle having at least one route characteristic corresponding to the at least one route characteristic of the portion of the route being traversed by the vehicle;
         the at least one vehicle parameter; and
         a plurality of other vehicle parameters of the vehicle, wherein the plurality of other vehicle parameters includes at least a weight of the vehicle and a manufacturer provided vehicle energy efficiency;
      determine a target coast end speed based on the at least one route characteristic, the vehicle energy consumption profile, a rolling friction of the vehicle, a draft coefficient of the vehicle, and the projected vehicle stop point or projected vehicle slowdown point;
      determine a target coast start point based on the at least one route characteristic and the target coast end speed; and
      selectively control vehicle propulsion of the vehicle based on the target coast start point.

14. The apparatus of claim 13, wherein the instructions to selectively control vehicle propulsion of the vehicle based on the target coast start point include communicating a recommendation to an operator of the vehicle to begin coasting at the target coast start point.

15. The apparatus of claim 14, wherein the instructions further cause the processor to selectively adjust the target coast end speed based on a user profile.

16. The apparatus of claim 15, wherein the instructions further cause the processor to adjust the user profile based on a determination of whether the operator followed the recommendation.

17. The apparatus of claim 16, wherein the instructions further cause the processor to:
   determine a learned operator behavior based on the user profile; and
   adjust the target coast end speed based on the learned operator behavior.

18. The apparatus of claim 17, wherein the instructions further cause the processor to:
   update the user profile based on determined current behavior of the operator;
   determine current operator behavior; and
   adjust the target coast end speed based on the current operator behavior.

19. A non-transitory computer-readable storage medium, comprising executable instructions that, when executed by a processor, facilitate performance of operations, comprising:
   identifying at least one route characteristic of a portion of a route being traversed by a vehicle;
   identifying a projected vehicle stop point or projected vehicle slowdown point associated with the portion of the route being traversed by the vehicle;
   identifying at least one vehicle parameter using a velocity dependent resistance force of a road load function;
   determining a vehicle energy consumption profile for the vehicle based on at least:
      historical data indicating energy consumption of the vehicle for at least a portion of a route previously traversed by the vehicle having at least one route characteristic corresponding to the at least one route characteristic of the portion of the route being traversed by the vehicle;
      the at least one vehicle parameter;
      a plurality of other vehicle parameters of the vehicle, wherein the plurality of other vehicle parameters includes at least a weight of the vehicle and a manufacturer provided vehicle energy-, of the vehicle; and
      historical data associated with at least one other vehicle for at least a portion of a route previously traversed by the at least one other vehicle having at least one route characteristic corresponding to the at least one route characteristic of the route being traversed by the vehicle;
   determining a target coast end speed based on the at least one route characteristic, the vehicle energy consumption profile, and the projected vehicle stop point or projected vehicle slowdown point;
   determining a target coast start point based on the at least one route characteristic and the target coast end speed; and
   selectively controlling vehicle propulsion of the vehicle based on the target coast start point.

20. The non-transitory computer-readable storage medium of claim 19, wherein selectively controlling vehicle propulsion of the vehicle based on the target coast start point includes communicating a recommendation to an operator of the vehicle to begin coasting at the target coast start point.

* * * * *